United States Patent [19]

Brumfield

[11] Patent Number: 5,366,278
[45] Date of Patent: Nov. 22, 1994

[54] SNAP-ON RETENTION DEVICE AND SYSTEM FOR WHEEL COVER

[76] Inventor: John H. Brumfield, 553 Air La., Colorado Springs, Colo. 80929

[21] Appl. No.: 209,308

[22] Filed: Mar. 14, 1994

Related U.S. Application Data

[63] Continuation of Ser. No. 930,796, Aug. 17, 1992, abandoned.

[51] Int. Cl.$^5$ .............................................. B60B 7/10
[52] U.S. Cl. ................................. 301/37.34; 301/37.36
[58] Field of Search ................. 301/37.1, 37.31, 37.32, 301/37.33, 37.34, 37.35, 37.36

[56] References Cited

U.S. PATENT DOCUMENTS

| | | | |
|---|---|---|---|
| 2,455,151 | 11/1948 | Wood | 301/37.34 |
| 2,644,721 | 7/1953 | Grimshaw | 301/37.34 |
| 2,926,960 | 3/1960 | Lyon | 301/37.36 X |
| 2,927,824 | 3/1960 | Simon | 301/37.34 |
| 3,389,937 | 6/1968 | Brumfield | 301/37.34 |
| 3,798,728 | 3/1974 | Beisch | 301/37.34 X |

Primary Examiner—Russell D. Stormer
Attorney, Agent, or Firm—Fields, Lewis, Pittenger & Rost

[57] ABSTRACT

A retention device and system for securing a disc, such as a wheel cover, to a wheel rim is disclosed. A first embodiment of the retention device includes a fastening member with a turned upper lip that hooks over the wheel rim, an inturned flexible section that extends along the flange of the wheel, a flexible base portion snap-fits to the wheel and subjected to a pressing force that defeats the spring action created in a bend of the base portion which in turn locks the disc retention device to the wheel. An upturned lower flange of the lower arm fits into an end of the connecting member which is attached thereto by means of a retaining member. The retaining member has an upper bight portion that extends through the upper lip of the connecting member and a pair of side legs extending perpendicular to the plane of the upper bight portion. The connecting member has two inturned folds which face opposite each other at open ends and a top arcuate edge. The retaining member is fitted up into the folds and extends through the lip of the connecting member. The disc having a downturned edge fits over the arcuate top edge providing attachment to the connecting member. A screwdriver or other prying tool when placed through the whole accompanied by a force exerted along the tip of the object overcomes the spring action allowing separation of the disc from the wheel rim. A plurality of circumferentially spaced retention devices are used as a system to secure the disc to the wheel rim. Further embodiments and variations in the shape of the connecting member of the lower arm and the disc may have inside slots or outside slots forming connecting male and female releasable parts to readily remove and replace the discs.

19 Claims, 3 Drawing Sheets

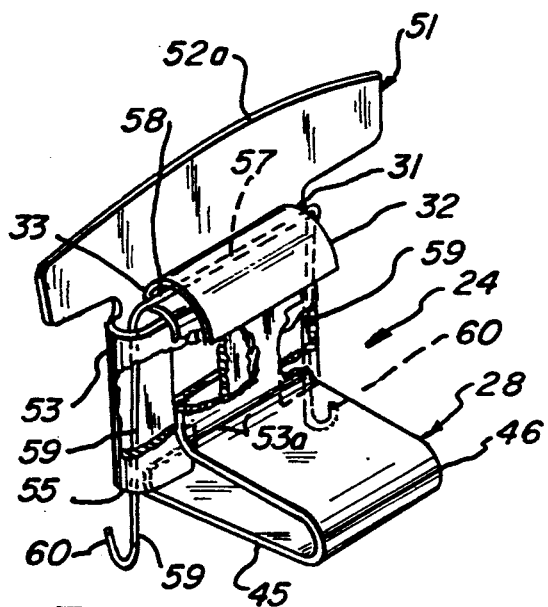
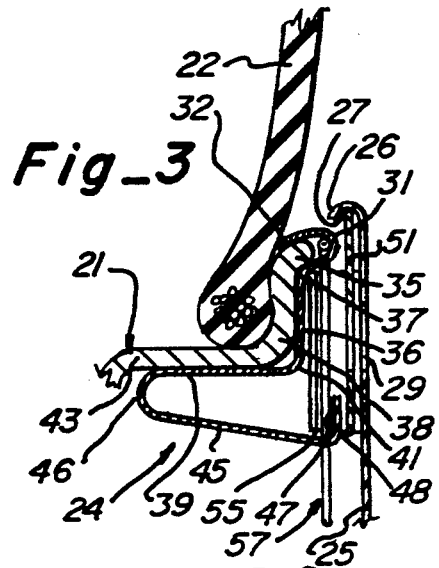
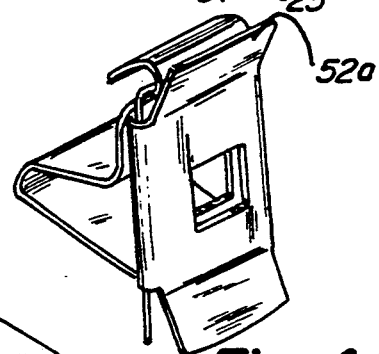
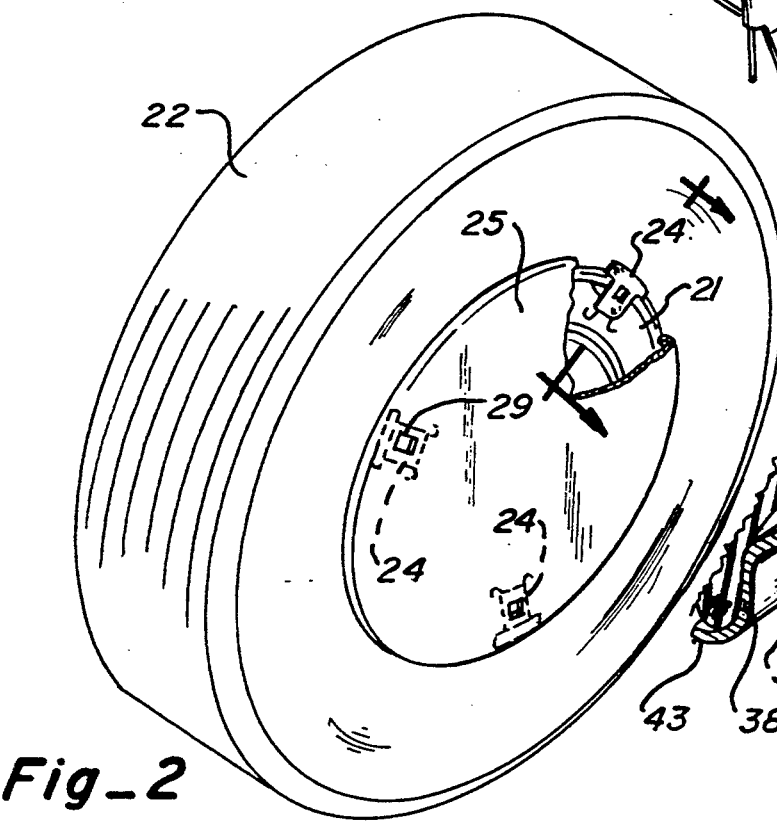
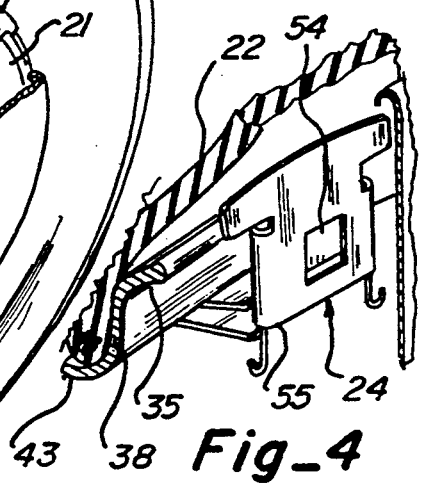

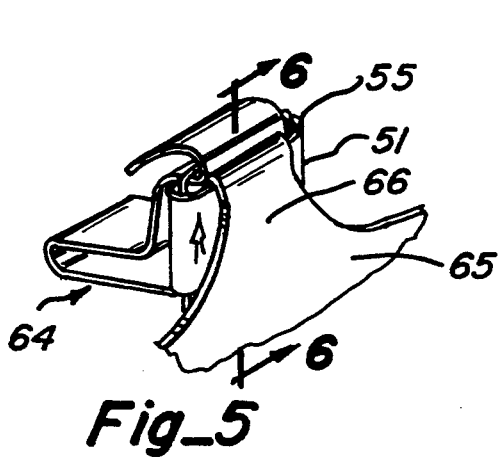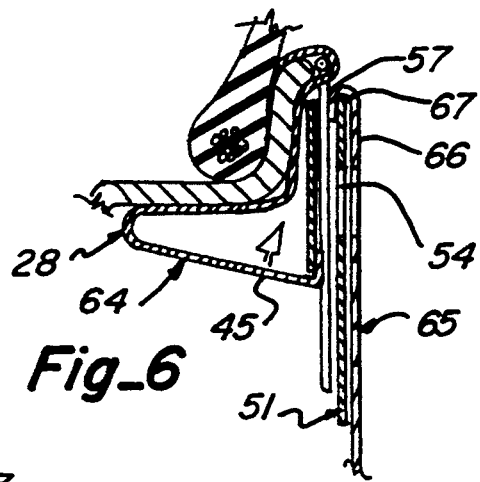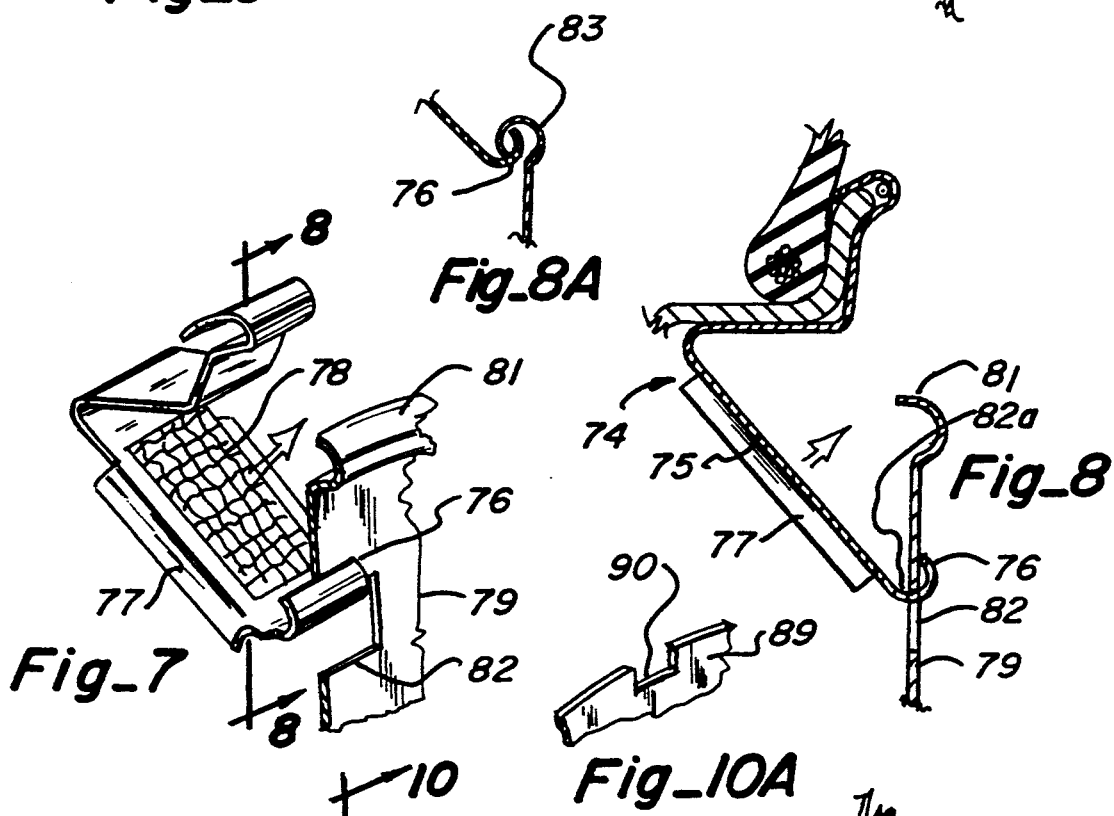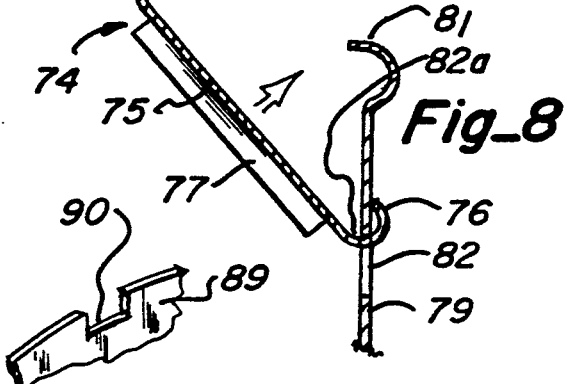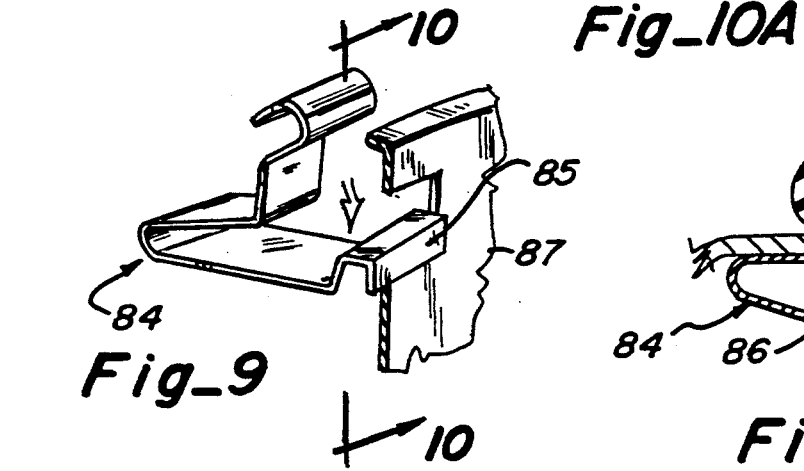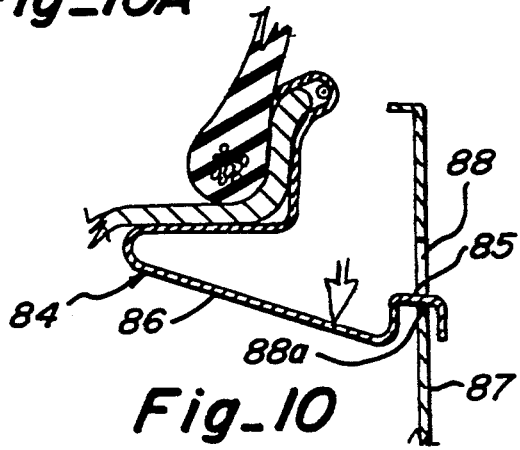

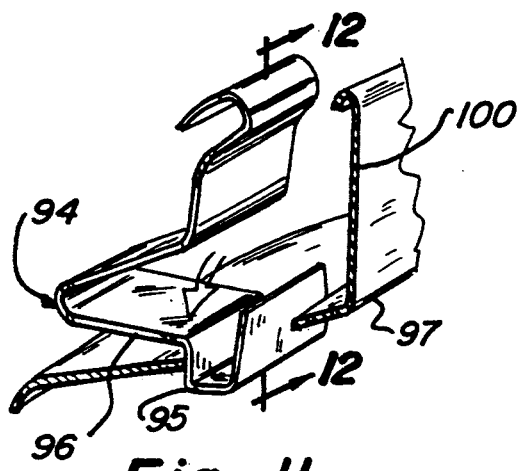
Fig_11
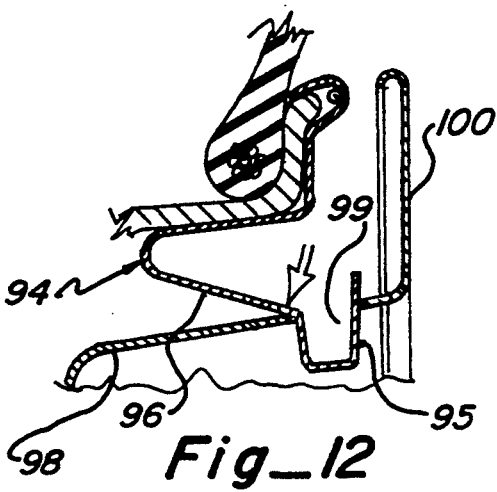
Fig_12
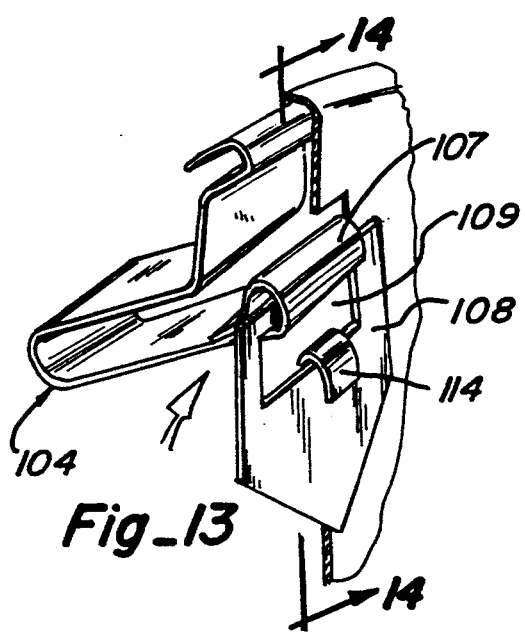
Fig_13
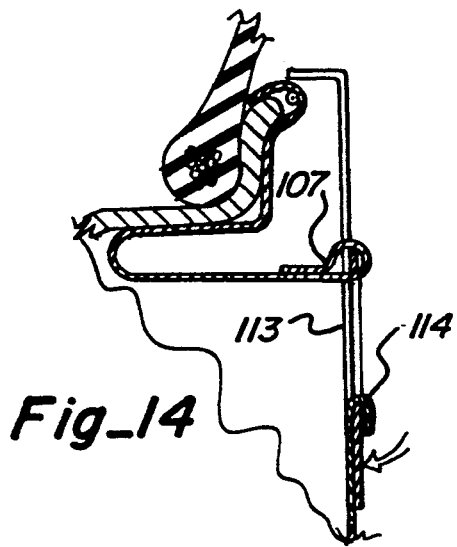
Fig_14
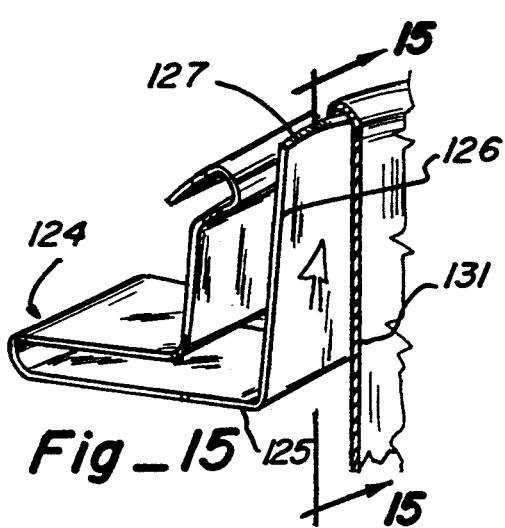
Fig_15
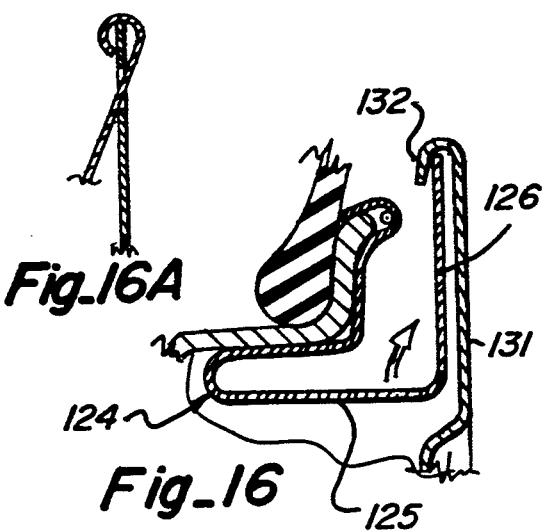
Fig_16A
Fig_16

5,366,278

SNAP-ON RETENTION DEVICE AND SYSTEM FOR WHEEL COVER

This application is a continuation of application Ser. No. 930,796, filed Aug. 17, 1992, now abandoned.

TECHNICAL FIELD

This invention relates generally to retention devices and systems and more particularly to devices and systems for the attachment of a disc, such as a wheel cover, to a wheel.

BACKGROUND ART

There have been many efforts to develop fastening devices and systems providing for the attachment of a disc such as a wheel covering to a wheel. The prior art generally discloses a single-piece leaf spring type fastener that attaches to a wheel. An example of this device which is also referred to as a "spring clip" is described in U.S. Pat. No. 3,769,729 to Engler and U.S. Pat. No. 2,629,957 to Lyon. Both of these disclosures make use of the spring clip to secure a disc to a wheel rim, with both types differing primarily in geometrical configuration. A disadvantage of the devices of these disclosures is that the free end of the spring clip is not easily adaptable to connecting to a variety of forms of discs that may be used. The single geometrical shape of the free end can only attach to a geometrically compatible disc. Further, the disclosures of U.S. Pat. No. 3,769,729 and U.S. Pat. No. 2,629,957 require removal by a prying force making contact against the disc and spring clip fastener, which could create damage to the integrity of the disc.

Another technique for displaying wheel discs is found in Matthews U.S. Pat. No. 5,072,536. This technique is functional only for static displays and cannot readily be used for rotating wheels. In this technique, the disc is attached to the wheel rim by means of a clip which differs from the disc retention device of the present invention because the clip is only a hooking device and makes no use of a spring type force to retain the disc.

DISCLOSURE OF THE INVENTION

The disc retention devices and system disclosed provides a means to readily attach a disc such as a wheel covering to a wheel. A first embodiment of the disc retention device shown includes a snap-on fastening member, a connecting member, and a retaining member that are readily assembled and disassembled. The retention device has an upper hook portion with a back turned upper lip that hooks over the rim of the wheel.

A base portion is arranged to snap-fit against the outer axial section of the wheel. A movable arm extends back in spaced relation to the base portion and is connected by a spring bias connecting means so that the movable arm portion will move between a disc release position and a disc hold position. The connecting member has a coupling portion to provide a means by which the disc releasably attaches to the connecting member. The retaining member interconnects between the fastening member and the connecting member to enable movement of the movable arm portion and provide ready assembly and disassembly of the three parts. Several of the embodiments have the movable arm portion spread from the base portion to release the disc while other embodiments have the movable arm portion contract toward the base portion to release. Several different coupling portions on the disc and associated movable arm portions are disclosed.

BRIEF DESCRIPTION OF THE DRAWINGS

Details of this invention are described in connection with the accompanying drawings which like parts bear similar reference numerals in which:

FIG. 1 is a front perspective view of a first embodiment of a disc retention device embodying features of the present invention with portions broken away to show interior parts.

FIG. 2 is a perspective view of a system showing three installed disc retention devices mounting a disc on a pneumatic tire on a wheel with portions broken away to show interior parts.

FIG. 3 is a sectional view taken along line 3—3 of FIG. 2.

FIG. 4 is an enlarged fragmentary perspective view of one of the retention devices shown in FIG. 3 on the wheel and showing a portion of the disc.

FIG. 4A is a partial perspective view of a modified connecting member for the disc retention device of FIG. 1.

FIG. 5 is a perspective view of a second embodiment of a disc retention device.

FIG. 6 is a sectional view taken along line 6—6 of FIG. 5 shown mounted on a wheel and supporting a disc.

FIG. 7 is a perspective view of a third embodiment of a disc retention device.

FIG. 8 is a sectional view taken along line 8—8 of FIG. 7 shown mounted on a wheel and supporting a disc.

FIG. 8A is a schematic view of a modified disc with a curved edge for the embodiment of FIG. 7.

FIG. 9 is a perspective view of a fourth embodiment of a disc retention device.

FIG. 10 is a sectional view taken along line 10—10 of FIG. 9 shown mounted on a wheel and supporting a disc.

FIG. 10A is a schematic view of a modified disc with a slot.

FIG. 11 is a sectional view of a fifth embodiment of a disc retention device.

FIG. 12 is a sectional view taken along lines 12—12 of FIG. 11 shown mounted on a wheel and supporting a disc.

FIG. 13 is a perspective view of a sixth embodiment of a disc retention device.

FIG. 14 is a sectional view taken along line 14—14 of FIG. 13 shown mounted on a wheel and supporting a disc.

FIG. 15 is a perspective view of a seventh embodiment of the present invention.

FIG. 16 is a sectional view taken along line 16—16 of FIG. 15 shown mounted on a wheel and supporting a disc.

FIG. 16A is a schematic view of a modified connecting portion on the movable arm.

DETAILED DESCRIPTION

In describing the specific embodiments herein chosen for illustrating the invention, certain terminology is used. The terms radially and axially refer to the illustrated retaining device embodiment and disc in its normal position of use on a wheel with "axially" referring to being in a direction along the axis of the wheel, "radially" referring to being in a direction radially of the axis of the wheel, "inwardly" referring to being toward the center of the wheel and "outwardly" referring to being away from the center of the wheel.

Referring now to FIGS. 1–4 there is shown the first embodiment of a retention device and retention system. A conventional wheel 21 having a conventional tire 22 mounted thereon is shown. Three identical circumferentially spaced retention devices 24 shown are mounted on the wheel at 120 degree intervals which in turn hold a disc 25 to the wheel which forms a cover for the wheel. The disc 25 shown is circular and has a bend along the outer periphery to form an axial section and terminating in a radially extending inturned lip 26 forming an arcuate female coupling portion 27 along the inside periphery of the disc 25. A hole 29 is provided in the disc.

Each retention device 24 includes a snap-on, snap-lock fastening member 28 preferably made of a relatively thin strip of spring metal such as steel formed in a particular configuration. The fastening member 28 includes an upper hook portion 31 having a downturned lip 32 and a first bend 33 of about 180 degrees to the lip which forms the upper hook portion 31 for hooking over the peripheral rim section 35 of the wheel. A neck portion 36 is connected at a second bend 37 of about 60 degrees to the inner leg of the upper hook portion 31 and the neck portion 36 extends away from the hook portion for extending along an outer radial section 38 of the wheel. A base portion 39 is connected at a third bend 41 of about 90 degrees to neck portion 36 to extend generally transverse to the neck portion 36 and opposite the hook portion 31. The base portion. 39 extends along the outer axial section 43 of the wheel and snap fits or snap locks thereagainst. The bend 41 serves as a spring bias connecting means that resiliently urges the base portion against the axial section 43 of the wheel.

A movable lower arm portion 45 connects to the base 39 at a fourth bend 46 of about 170 degrees to the base portion 39 so that as shown in FIG. 3 the arm portion 45 extends down from a horizontal plane at an angle of about 10 degrees. This lower arm portion 45 extends back and in spaced relation to the base portion 39 and has a movable free end portion 47 that moves in a radial direction with respect to the wheel from a hold position closest to the hook portion and spreads away from the base portion to a release position with flexure occurring at the fourth bend 46 when a force is applied to arm portion 45. The base portions and movable arm are formed of a one-piece strip of resilient material whose spring action is such that when the fourth bend is forcibly deformed by moving the movable end portion relative to the base portion the fourth bend provides a means for exerting a disc retaining force along the fastening arrangement of the hook portion and base portion in a direction radially of the wheel and against an axial section of the disc. An upturned lower flange portion 47 connects to the end of the lower arm portion at a fifth bend 48 of about 90 degrees to arm portion 45. The peripheral rim section 35, outer radial flange section 38 and outer axial flange section 43 of the wheel 21 are of the same size and shape on almost all currently available wheels so the fastening member 28 will readily snap-on almost all such wheels.

A connecting member 51 is secured to the fastening member 28 and has a male coupling portion 52 that releasably connects to the mating female coupling portion 27 of the disc so as to releasably fasten the disc 25 to the retention device. The male coupling portion 52 is in the form of a thin, flat plate with an arcuate or curved top peripheral edge 52a that conforms to the curvature of the inside of the female coupling portion of the bent disc and will slidably insert into and withdraw from the female coupling portion 27. The male coupling portion 52 has wings that extend beyond the main body to provide substantial surface contact with the disc. The connecting member has two inturned folds 53 with a gap or spacing between the inside edges of the folds 53a and defining a channel-shaped open end portion 55. A rectangular hole 54 is provided in the connecting member to enable a prying tool to be inserted through disc hole 29 hole 54 spaced edges 53a to move the movable arm portion 45 to a retracted release position to install the disc. A modified form of male coupling portion 52a shown in FIG. 4A is smaller and has an inturned bend to mount the disc closer to the wheel.

A retaining member 57 shown is made from a wire and is used to removably secure the fastening member 28 to the connecting member 51. The retaining member 57 has a bight portion 58 and parallel spaced arm portion 59 each with an outturned end portion 60 which prevents the device from coming apart.

The bight portion 58 of the retaining member 57 extends through the upper hook portion 31 with the two side arm portions 59 extending through the two inturned folds 53. The lower end flange portion 47 extends into the channel-shaped open end portion 55. In this way when the movable arm portion 45 is moved or spread away from the hook and base portion in response to a force the connecting member 51 also moves away. When the force is removed the lower arm portion 45 returns toward the hold position closest to the hook portion and the connecting member 51 moves up to engage and hold the disc 25 as a result of the spring force in arm portion 45 at bend 46. Bend 46 thus serves as a spring bias means for the movable arm portion.

The hook portion 31 serves to initially hook the retention device to the wheel rim, and to subsequently stabilize the device on the wheel rim once the inturned base portion engages the wheel. The base portion lodges under an outer axial section of a wheel and holds the retention device in place by means of a spring force. To install the retention device, the upper lip is placed over the wheel rim, then a force is applied to the disc connecting member in a direction parallel to an inturned base portion and a movable arm portion. When a force is applied, the base portion and a lower arm portion are forced to a contracted position in a relation of closer proximity, and contact is made with the underside of the wheel. A release of force allows the spring-like characteristic of the movable arm portion to hold the disc retention device in place.

To remove the device a pry device such as a screwdriver is then inserted from the outside through holes 29 and 54 and a force is applied to the lower arm portion 45 to move the connecting member 51 to a spread release position further from the hook portion against the spring fastener which is inwardly in a radial direction with respect to the wheel. This allows the disc to be put in place and thereafter the spring force in the bend 46 for the lower arm portion 45 causes the connecting member to move radially outwardly to the hold position and hold the disc 25 in place.

Referring now to FIGS. 5–6 there is shown a retention device 64 which has the same parts as the device 24 shown in FIGS. 1–4 but has the connecting member 51 reversed in position or inverted end to end. The channel-shaped end portion 55 connecting member then forms a female socket portion used to connect to the disc. The disc 65 shown is a flat circular plate that has a radially extending hook portion 66 for each retention device arranged extending out from the periphery of the disc so that the downturned lip 67 fits into the female socket portion 55. The disc 65 for retention device 64 is attached or removed by inserting a prying device such as a screwdriver through the hole 69 in the disc and hole 54 and pushing against the lower arm portion 45 to move spread it away from the base portion against the spring action to the release position in the same manner as above described.

Referring now to FIGS. 7 and 8 the retention device 74 shown is modified by having the movable arm portion 75 made longer and bent back at a lesser angle on the order of 130 degrees and formed at the free end with a circular hook portion 76. The movable arm is formed with a pair of curved side arms 77 and the outer face is made with a decorative surface 78. The disc 79 is a flat, circular plate with a curved peripheral edge 81 and has a slot 82 inset from the peripheral edge. The hook portion 76 inserts into the slot 82 and an overhanging edge 82a defining the slot 82 has the hook bearing upwardly thereagainst due to the spring force to hold the disc 79 in place against the movable arm portion is spread away from the base portion against the spring force by a force to release the disc. A modified form of disc shown in FIG. 8A has a hook portion 83 on the peripheral edge that fits into the hook portion 76a.

Referring now to FIGS. 9–10 the retention device 84 shown is modified from device 24 above described by providing an inverted channel portion 85 at the end of the associated movable arm portion 86. The disc 87 has a slot 88 with a bottom upstanding edge 88a and the inverted channel portion 87 extends through the slot 88 and bears against the upstanding edge 88a and is resiliently urged thereagainst by the spring force. In this case the spring force is directed away from the base portion against the spring force and a force is applied to contract the movable arm portion toward the base portion to release the disc from the connecting member.

Referring now to FIGS. 11–12 there is shown a retention device 94 having an upstanding channel portion 95 at the end of the associated movable arm portion 96. The disc 97 is in the form of a conventional wheel ring with an axial section 98 having a slot 99 and a radial section 100. The channel portion 95 snap-fits down into the slot 99 due to the resilience or flexure of the movable arm portion and is removed by applying a force to push the channel portion out of the slot. As with the previously disclosed form the movable arm portion is contracted toward the base portion to release the disc.

Referring now to FIGS. 13–14 there is shown a retention device 104 shown having a movable arm portion 105 having a coupling portion at the free movable end which includes a closed end loop 107 that connects to a plate 108 with a slot 109. The plate 108 pivots about loop 107. The disc 112 has a slot 113 with a folded over portion 114 at one end of the slot. The folded over portion 114 extends through the slot 113 in the disc and slot 109 in plate 108 and slidably fastens the disc to the retention device. The disc is removed by applying a force to the plate so the folded over portion clears slot 109. The applied force spreads the movable arm portion away from the base portion against the spring force to release the disc.

Referring now to FIGS. 15–16 the retention device 124 shown has a movable arm portion 125 with a generally flat plate portion 126 that extends transverse to the free end of the movable arm portion 125. The outer curved edge 127 of plate portion 126 conforms to the inside of the disc forming a male coupling portion like portion 52 above described but is not movable relative to arm portion 125. The disc 131 has a downturned peripheral edge 132 that forms a female coupling portion in a manner similar to that shown in FIGS. 1–4. The release force is in a direction to spread the movable arm portion away from the base portion against the spring force. A modification form shown in FIG. 16A is to form an inturned hook 135 in the end of the plate portion 126 and have the hook extend through a slot 136 in a disc 137 and around over the top peripheral edge 138 of the disc.

From the foregoing it is apparent the present invention provides for a simple yet economical disc retention member and system approach which is capable of providing retention of many differing styles of wheel discs or coverings. Additionally, the access hole inherent to the design allows for a quick and easy removal of the retention system without the danger of damaging the wheel disc or cover. Moreover, because of the simplicity in geometric configuration of each component, and the numerous types of metals conducive to each application, the system is easily manufactured in terms of cost and effort.

Although the present invention has been described with a certain degree of particularity, it is understood that the present disclosure has been made by way of example and that changes in details of structure may be made without departing from the spirit thereof.

What is claimed is:

1. A retention device for releasably securing a disc to a wheel comprising:

fastening means adapted to be attached to and extend along an outer face and extend substantially radially of a wheel, said fastening means including
a hook portion for hooking over a rim section of a wheel and
a base portion connected to said hook portion and shaped to extend along an outer axial section of said wheel, said base portion being arranged for engaging said outer axial section to retain said hook and base portions on said wheel,
a cantilever-like movable arm connected at an axially inner end to said base portion at a bend and extending axially out from said bend and extending in spaced relation to said base portion for extending in a direction substantially axially of said wheel, said movable arm having a movable end portion opposite said bend that is movable in a direction along said fastening means substantially axially of said wheel between a disc hold position and a disc release position, said base portion and movable arm being formed of a one-piece strip of resilient material whose spring action is such that when said bend is forcibly deformed by moving said movable end portion relative to said base portion said bend provides a means for exerting a disc retaining force along said fastening means in a direction substantially radially of said wheel against an axial section of said disc, and
connecting means connected to said movable end portion having a coupling portion that releasably connects to a mating coupling portion on a disc in said disc hold position and releases said disc from said connecting means in said disc release position, said disc retaining force being directed against an axial section of said disc.

2. A retention device as set forth in claim 1 wherein said resilient material is a strip of spring metal.

3. A retention device as set forth in claim 2 wherein said coupling portion on said movable end portion is in the form of a flat connecting plate with a peripheral edge, said disc having a bend along the outer periphery that forms said axial section and terminates in a radially inturned lip that forms a female coupling portion into which said peripheral edge slide fits.

4. A retention device as set forth in claim 1 wherein said coupling portion is in the form of an open-ended, generally channel-shaped female socket, said disc having a hook portion formed along and extending radially out from a peripheral edge of said disc, said hook portion having a bend that forms said axial section and terminates in a radially inturned lip that is slidably received in said female socket.

5. A retention device as set forth in claim 1 wherein said coupling portion of said connecting means is in the form of a radially outturned hook portion, said disc having a slot through which said outturned hook portion inserts and an overhanging edge defining a side of said slot against which said hook portion is moved by a radially outwardly directed force provided by said bend.

6. A retention device as set forth in claim 1 wherein said coupling portion of said connecting means is in the form of a radially inwardly facing channel portion, said disc having a slot through which said channel portion inserts and a bottom edge defining a side of said slot against which said channel portion is moved by a radially inwardly directed force provided by said bend.

7. A retention device as set forth in claim 1 wherein said disc is in the form of a substantially flat ring having an axial section and a radial section, said coupling portion of said connecting means is in the form of a radially outwardly facing channel portion, said disc having an axial slot into which said channel portion inserts and is moved by a radially outwardly directed force provided by said bend.

8. A retention device as set forth in claim 1 wherein said coupling portion of said connecting means includes an end loop that connects to a plate member with a first slot, said disc having a second slot and a folded over edge, said folded over edge extending through said first and second slots to slidably fasten said disc to said fastening member by a radially inwardly directed force provided by said bend.

9. A retention device as set forth in claim 1 wherein said coupling portion of said connecting means is in the form of a generally flat connecting plate that is integral with said movable end portion and extends radially out and away from said movable end portion and has a peripheral edge, said disc having a bend along the outer periphery that forms said axial section and terminates in a radially inturned lip that forms a female coupling portion into which said peripheral edge inserts and is moved by a radially outwardly directed force provided by said bend.

10. A retention device as set forth in claim 1 wherein said connecting means is in the form of a thin, flat plate with an arcuate peripheral edge that conforms to the inside edge of the disc, two inturned folds with a gap between the inside edges defining a channel-shaped open end, and a hole in the flat plate to receive a tool to apply a force to said movable end portion to selectively release said disc.

11. A retention device as set forth in claim 10 wherein said retention means is in the form of a wire having a bight portion and parallel spaced side arms with outturned end portions, said bight portion extending through said hook portion of said fastening means and said side arm in said inturned folds.

12. A retention device as set forth in claim 1 wherein said connecting means includes
    a connecting plate having an outer peripheral edge, two inturned folds along opposite sides to provide two spaced inside side edges defining a gap,
    a channel-shaped first open end opposite said outer peripheral edge; and a channel-shaped second open end having inner end edges adjacent said movable end portion so that movement of said movable end portion in one direction moves against said inner end edges to move said connecting plate,
    retention means supported by said fastening means having opposed side portions extending inside said inturned folds to secure said connecting plate to said fastening means and to guide the movement of said connecting plate between said positions.

13. A retention device as set forth in claim 12 wherein said connecting plate is reversible end for end so that in an alternate position said channel-shaped first open end is disposed at a radially outer position and serves as a female socket, said disc having a hook portion formed along and extending radially out from a peripheral edge of said disc, said hook portion having a bend that forms said axial section and terminates in a radially inturned lip that is slidably received in said female socket.

14. A retention device for releasably securing a disc to a wheel, said retention device comprising:
    a snap-on, snap-lock fastening means made of a strip of spring metal and adapted to be attached to and extend along the face of a wheel, said fastening means including
    a hook portion having a turned lip and a first bend of about 180 degrees to said lip for hooking over a rim section of a wheel,
    a neck portion connected at a second bend to said hook portion and extending away from said hook portion for extending along an outer radial section of said wheel and
    a base portion connected at a third bend of about 90 degrees and extending transverse to said neck portion and opposite said hook portion for extending along an outer axial section of said wheel,
    a cantilever-like movable arm connected to said base portion at a fourth bend of about 180 degrees to said base portion and extending axially out from said bend, said movable arm extending in a spaced relation to said base portion for extending in a direction substantially axially of said wheel and having a movable end portion opposite said third bend on said lower arm portion that moves in a direction along said fastening means substantially axially of said wheel from an outer at rest position to an inner retracted position when a force is applied thereto that widens the space between said base portion and lower arm portion and returns to said at rest position when the force is removed as a result of the spring action at said fourth bend, said base portion and movable arm being formed of a one-piece strip of resilient material whose spring action is such that when said fourth bend is forcibly deformed by moving said movable end portion relative to said base portion said fourth bend provides a means for exerting a disc retaining force along said fastening means in a direction substantially radially of said wheel against an axial section of said disc, connecting means connected to said movable end portion having a coupling portion that releasably connects to a mating coupling portion on a disc to releasably fasten said disc to said connecting means, said disc retaining force being directed against an axial section of said disc, and retaining means for holding said fastening means to said connecting means.

15. In a retention system for securing a disc to a wheel including a plurality of circumferentially spaced retention devices connected between said wheel and disc, each said retention device comprising:

fastening means adapted to be attached to and extend along the face of a wheel, said fastening means including a hook portion for hooking over a rim section of a wheel and a base portion connected to said hook portion and shaped to extend along an outer axial section of said wheel, said base portion being arranged for engaging said outer axial section to retain said hook and base portions on said wheel, a cantilever-like movable arm connected to said base portion at an axially inner end to said base portion at a bend and extending axially out from said bend in spaced relation to said base portion for extending in a direction substantially axially of said wheel, said movable arm having a movable end portion that is movable in a direction along said fastening means substantially axially of said wheel between a disc hold position and a disc release position, said base portion and movable arm being formed of a one-piece strip of resilient material whose spring action is such that when said bend is forcibly deformed by moving said movable end portion relative to said base portion said bend provides a means for exerting a disc retaining force along said fastening means in a direction substantially radially of said wheel against an axial section of said disc, and connecting means connected to said movable end portion having a coupling portion that releasably connects to a mating coupling portion on a disc in said disc hold position and releases said disc from said connecting means in said disc release position, said disc retaining force being directed against an axial section of said disc.

16. A combination wheel and disc assembly comprising:

a wheel, a disc secured to an outer face of said wheel, said disc having a coupling portion with an axial section, at least one retention device releasably securing said disc to said wheel, said retention device including fastening means attached to and extending along an outer face and extending substantially radially of said wheel, said fastening means including a hook portion for hooking over a rim section of a wheel and a base portion connected to said hook portion and shaped to extend along an outer axial section of said wheel, said base portion being arranged for engaging said outer axial section to retain said hook and base portions on said wheel, a cantilever-like movable arm connected to an axially inner end of said base portion at a bend and extending axially out from said bend and extending in spaced relation to said base portion, said movable arm having a movable end portion opposite said bend that is movable in a direction along said fastening means for extending in a direction axially of said wheel between a disc hold position and a disc release position, said base portion and movable arm portion being formed of a one-piece strip of resilient material whose spring action is such that when said bend is forcibly deformed by moving said movable end portion relative to said base portion said bend provides a means for exerting a disc retaining force along said fastening means in a direction radially of said wheel, and connecting means connected to said movable end portion having a coupling portion that releasably connects to said coupling portion on said disc, said disc retaining force being directed against an axial section of said disc.

17. An assembly as set forth in claim 16 wherein said connecting means includes a connecting plate with a peripheral outer edge that will slide into said disc coupling portion and bear against said axial section.

18. An assembly as set forth in claim 16 wherein said connecting means includes a connecting plate with inturned folds along opposite sides to provide a pair of opposed channel-shaped open ends defining a female socket at an outer end, said disc having a hook portion formed along and extending radially out from a peripheral edge of said disc, said hook portion having a bend that forms said axial section and terminates in a radially inturned lip that is slidably received in said female socket.

19. An assembly as set forth in claim 16 wherein said connecting means includes a connecting plate integral with said movable arm and extending transverse to said movable arm portion.

* * * * *